United States Patent Office 3,280,232
Patented Oct. 18, 1966

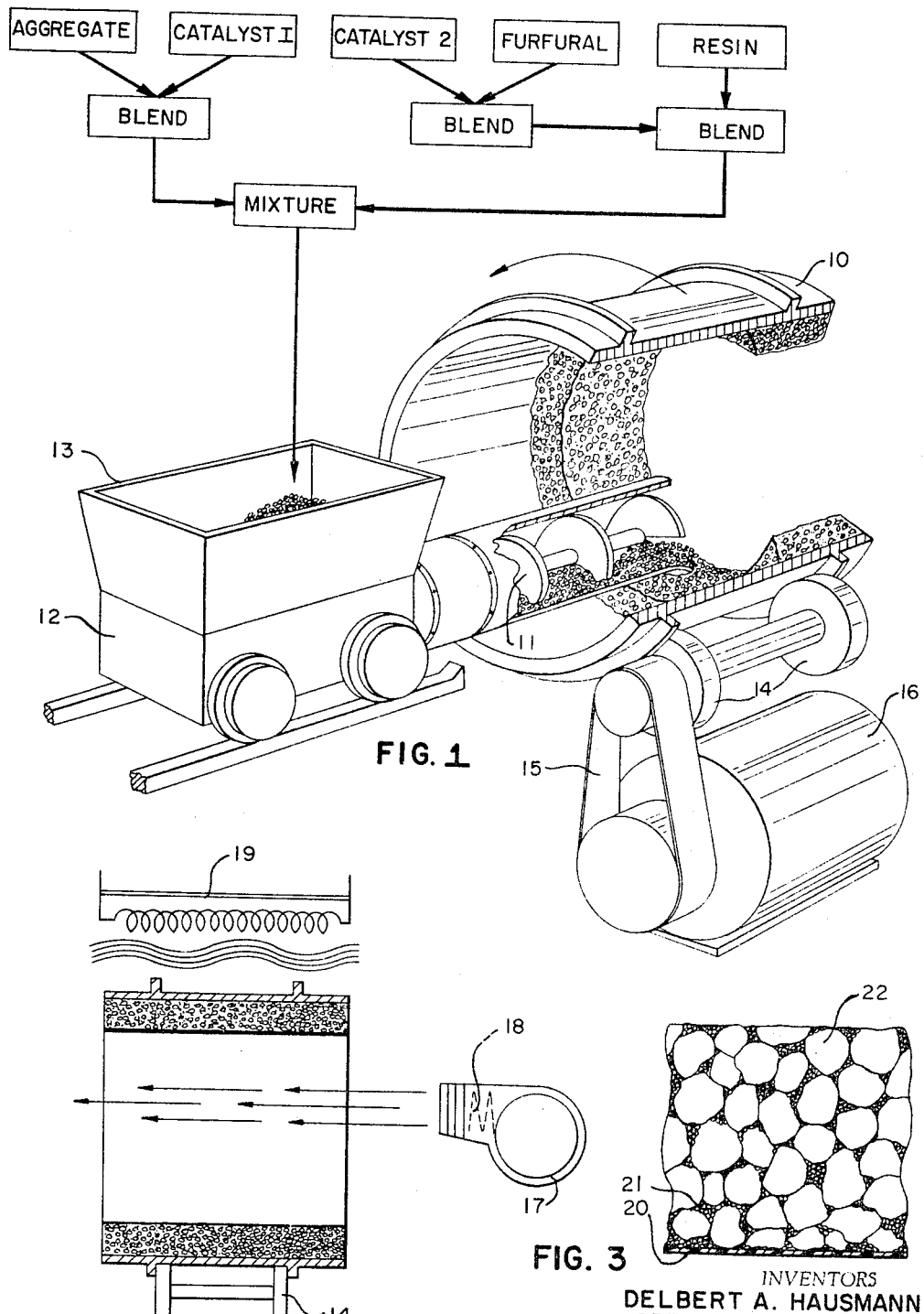

3,280,232
CENTRIFUGAL PROCESS FOR MAKING
PRODUCTS WITH FURAN RESIN
Arthur G. Lander, Alhambra, and Delbert A. Hausmann, Glendale, Calif., assignors to American Pipe and Construction Co., Monterey, Calif., a corporation of California
Original application Aug. 6, 1963, Ser. No. 300,001. Divided and this application Sept. 8, 1964, Ser. No. 394,814
7 Claims. (Cl. 264—71)

This application is a division of our application Serial No. 300,001, filed August 6, 1963.

This invention relates to methods of manufacture of products formed from a mixture of aggregate material and furan resin. More particularly, the invention involves a process for using a novel mixture of granitic-type aggregate or other nonacid-reactive material and furan resin and further involves novel processes for making a type of concrete pipe having totally new physical properties.

The use of furan resin as a binder for mortars is known, as is the use of aqueous solutions comprising furfuryl alcohol for treating porous materials. Exemplary disclosures of furan resin mixtures and its uses may be found in United States Patents 2,367,312 and 2,909,450.

In general, it is well known that furfuryl alcohol can be polymerized to a solid state with a polymerization catalyst. The catalyst provides a hydrogen ion that supports a chemical reaction where water is a by-product.

The same type of polymerization is utilized in connection with the present invention. However, the rate of polymerization is controlled in various unique ways by the type of catalyst employed, by the process in which the material is used and by controlling the temperature of the resin prior to mixing with a granitic-type of aggregate.

Furan resin possesses a high degree of resistance to chemicals, and because of its durability, it has been mixed with various non-reactive filler materials to form an acid-resistant masonry mortar. Furan mortars have also been used as floor toppings which are considerably less expensive than other materials of comparable durability. However, there are definite limitations in using furan resin, since it will not make bond with an alkaline surface and since it may become brittle.

Conventional furan mortars are very plastic in character when applied and contain from 25 to 50 percent resin with very fine-grained filler materials dispersed throughout the resin matrix. The filler materials of these furan mortars are very pure and inert, such as carbon and silica sand. While such materials may also be used in connection with the present invention, they alone are unsuitable.

In brief, the present invention involves a method of using a very dry, harsh mixture containing no more than 25 percent resin by weight and preferably in a range from 10 to 15 percent. Furthermore, the resin mixtures used with this invention include both coarse and fine aggregates which are closely packed with particle-to-particle contact. The products formed with such mixtures possess physical properties totally different from any plastics, concretes or mortars now known. Its behavior under stress is essentially elastic rather than plastic, and although it is comparable to Portland cement concrete in compressive strength, products formed are superior in tensile strength, flexural strength, durability and impermeability. Thus, it combines the excellent structural properties of concrete with the chemical resistance of certain plastics. As a consequence of being completely resistant to attack by all commonly encountered acids and alkalies, the material is of particular utility in the manufacture of sewer pipe.

It has been discovered that unique advantages may be derived by centrifugally casting a settable mixture of furan resin and granitic-type of nonacid-reactive aggregate, providing that the amount of resin is controlled and certain unique steps are taken to avoid segregation and undesirable migration of the resin. The centrifugal process employed permits the use of very harsh mixes which cannot otherwise be molded satisfactorily by tamping, vibrating, extruding, or by any other known process. For example, a mixture of aggregates with ¾-inch particle size and an aggregate-to-resin ratio of 10:1 by weight can be centrifugally cast, whereas it could not be suitably cast using other conventional processes.

The centrifugal processes herein contemplated are used to produce a thin film of resin as a liner for the interior pipe surface. However, the cycle of spin casting must be closely controlled to avoid forming a film thickness greater than ⅛ inch, and since the density of compaction is greatly dependent upon the spinning action, it is of importance that the resin-richness of the mixture be within a specified range. More specifically, it has been discovered that the preferred ratio of aggregate-to-resin, by weight, be within a range between 12:1 and 4:1 if satisfactory results are to be obtained. The most effective ratio of aggregate-to-resin will vary with the thickness of pipe being formed. An insufficient amount of resin will fail to form an inner lining as intended, and in some instances the pipe may lack strength. Also, if the mix is deficient in resin the centrifugal process employed forces the resin to the outer form, leaving the interior pipe surface dry and rough. If too much resin is used, the inner lining may be formed too rapidly, and it would then be necessary to select beween a pipe lining greater than ⅛ inch (which will have a tendency to crack) and a pipe that is weak because of insufficient compaction.

The proper amount of resin may be determined for any pipe diameter by rudimentary testing or computation. In general, this will be an amount of resin slightly more than necessary to fill the interstices of the aggregate material, and just enough to provide a glossy inner surface after full spin casting of the pipe. The thickness of the film should in no event exceed ⅛ inch.

The dense film of resin which may be produced on the interior surface of centrifugally cast pipe reduces permeability and increases chemical resistance where it is needed most. Centrifugal casting has the further distinct advantages of: increasing the exothermic reaction rate of the furan resin (through increases in pressure), thereby enhancing the effects of catalytic reaction and producing a rapid and thorough cure; and expelling water formed as the result of polymerization to the inside of the pipe form where it may be evaporated at the free surface.

Other objects of this invention will become apparent in view of the following detailed description and the accompanying drawings.

In the drawings forming a part of this application, and in which like parts are designated by like reference numerals throughout the same, FIG. 1 is a perspective and diagrammatic view demonstrating the steps by which a resin-aggregate mixture is prepared and centrifugally cast in a conventional pipe form;

FIG. 2 is a vertical section through the pipe form of FIG. 1 after the mixture has been centrifugally cast, and further showing related apparatus used to effect initial curing of the pipe;

FIG. 3 is a fragmentary section taken through one side of a cured centrifugally cast pipe on a diameter thereof.

The present invention involves methods of making products from a settable mixture comprising washed and dried granitic-type material having both coarse and fine particles and furan resin. The ratio of aggregate material to resin must be in a range between 12:1 and 4:1 if the advantages contemplated are to be obtained, but the best ratio may be determined by rudimentary testing.

The aggregates employed may be the same as conventional concrete aggregates but which are free of acid solubles. The maximum size coarse aggregate should not be greater than one-half the wall thickness of the pipe being cast, and the aggregate gradings should meet ASTM specification C–33 for concrete aggregates. Coarse and fine aggregates (as defined by ASTM specifications) may be mixed in equal parts for forming pipe in a conventional 18 inch pipe form. However, a greater proportion of fine aggregate material should be used in forming pipes of smaller size having less wall thickness.

The composition of furan resin used must not be too thin or there may be weakness in the resulting product. On the other hand, a thick resin will be difficult to mix into the aggregate. It has been discovered that the ratio between reacted furfuryl alcohol and unreacted furfuryl alcohol monomer should be in a range between 1:1 and 1:3.

Although many types of acid catalyst may be used to produce suitable products, some catalysts are much too active at room temperature. A preferred group consists of sodium bisulfate, aniline hydrochloride, benzenesulfonyl chloride, ferric chloride, paratoluenesulfonic acid, paratoluenesulfonyl chloride, and benzenesulfonic acid. Various combinations of these catalysts can be used with great effectiveness, particularly the combination of sodium bisulfate and aniline hydrochloride. A "two-part" catalyst involving those two produces one cure at room temperature and additional curing at higher temperatures above 100° F. Sodium bisulfate is especially effective as a catalyst at relatively low temperatures compared with aniline hydrochloride, which works well at oven-curing temperatures of 100° F. and above. The amount of catalyst employed may be varied to a large extent, depending mostly upon the catalyst selected. As an example, it has been found that either sodium bisulfate or aniline hydrochloride may be used in a range from 3 to 15 percent of the resin, by weight.

With particular reference to FIG. 1, it is desirable that a catalyst in powdered form be added to the aggregate material and blended before the resin is mixed therewtih. In addition, or alternatively, a second catalyst may be dissolved in furfuryl and then mixed directly with the resin. In either case, the resin should be cooled well below room temperature, or to approximately 40° F., before being mixed with the catalyst. This allows the polymerization process to be closely controlled and, in fact, triggered by the compressive forces developed by centrifugal casting. Cooling the resin and resin-aggregate mixture holds back the reaction until after the mixture has been compacted by spinning, and in this manner a thorough and complete cure is obtainable.

The centrifugal process by which pipe may be formed involves the standard practice of feeding a prepared mixture into a rotating pipe form 10 with a screw type feeder 11 mounted on a car 12 having a hopper 13. The centrifugal casting machine comprises two pairs of horizontally spaced rollers 14, one set being driven through a V-belt drive 15 by a motor 16.

The speed of pipe-form rotation is controlled during the time that the prepared mixture is fed into the form so that the mixture is distributed evenly. Moreover, it is essential that the pipe form be rotated well below the full speed of normal casting to prevent segregation and premature migration of the resin. A speed of 150 r.p.m. may be used for an 18 inch pipe form. Other speeds would be used for pipe forms of other sizes but not to exceed that which would produce a 10 g. force.

During the time that the mixture is fed into the pipe form, vibrations may be imparted thereto through its roller supports to level the aggregate to a uniform thickness. Alternatively, or additionally, the inner surface of the mixture may be screeded or rolled immediately after feeding and prior to normal centrifugal spinning.

Centrifugal casting of the pipe is completed by increasing the speed of form rotation and continuing until a thin layer of resin forms on the inside surface of the pipe casting. This speed may be 300 r.p.m. or twice that of the speed used for feeding the prepared mixture into an 18 inch pipe form. In any event, the rapid spin of casting (or full spin) should be sufficient to produce a force of approximately 30–40 g.

As soon as in thin layer of resin appears on the inside surface of the pipe casting (not to exceed 1/8 inch), speed is immediately reduced to the speed of the form when the mixture was being fed thereinto. If required, the inside surface of the pipe may then be troweled. The thickness of the resin film that is formed is of great importance, since excessive differential shrinkage will occur in layers more than 1/8 inch thickness and this will eventually result in film cracking. A resin film thickness of 1/32 inch is preferred, and a proper selection in the amount of resin will allow the interstices of the aggregate to be filled with a slight excess to form the desired film. While the amount of void space defined by the aggregate particles may vary within a broad range (depending upon the size and amount of coarse and fine particles in the aggregate mixture), the ratio of aggregate-to-resin is preferred to be within a range of between 12:1 and 4:1.

Initial curing of an 18 inch centrifugally cast pipe may take approximately 15 minutes, and during this time the pipe form is constantly rotated at slow speed. Moreover, and as shown in FIG. 2, a blower 17 having a heating element 18 is utilized for moving hot air through the center of the casting to evaporate free moisture formed by the polymerization process. The heat also accelerates curing of the inner film of resin. Additional heat supplied by a radiant heater 19 may be directed against the exterior surface of the pipe form to hasten curing. After initial curing, rotation may be stopped. The form containing the cast pipe is then removed from the spinning bed for a secondary heat cure. This curing may be carried out in a chamber filled with infra-red burners that maintain a temperature of approximately 100° F. The pipe form with casting is subjected to this chamber curing for approximately two hours, after which the pipe may be stripped from the form and given a final overnight heat cure at the same temperature or higher.

FIG. 3 illustrates a typical cross-section taken diametrically through a pipe which has been centrifugally cast in the manner described above. It will be particularly noted that a thin resin film 20 is deposited upon the inner surface of the pipe while resin binder 21 is distributed homogeneously throughout the aggregate particles 22 as to fill all of the interstices. Moreover, particles 22 are pressed into particle-to-particle contact for the purposes herein set forth.

Although a preferred form of this invention has been described, it is to be understood that various changes or departures may be made in the process described without departing from the spirit of the invention or the scope of the attached claims, and each of such changes or departures is contemplated.

What we claim and desire to secure by Letters Patent is:

1. A process for making chemically resistant pipe from a mixture of granitic-type aggregate material, furan resin and a catalyst, comprising the steps: feeding the mixture into a rotating pipe form while said form is being rotated at an angular speed less than that which will produce segregation and migration of the resin, rotating the pipe form at an increased angular speed sufficient to produce compaction of aggregate and displacement of excess resin to the inside of the pipe casting until a thin layer of resin forms on the interior surface of the casting, then reducing the speed of rotation and subjecting said pipe casting to a heat source.

2. The process of claim 1 wherein hot air is moved through the center of said pipe casting while it is undergoing final rotation at reduced speed.

3. The process of claim 1 wherein an external heat source is directed against the outer surface of said pipe form while it is being rotated.

4. The process of claim 1 wherein said pipe form is vibrated while the mixture is being fed thereinto.

5. The process of claim 1 and further including the step of rolling the inner surface of the cast pipe after the mixture is fed into the pipe form and prior to rotating the pipe form at an increased speed.

6. The process of claim 1 and further including the step of troweling the inner surface of the cast pipe after rotating the pipe form at an increased speed.

7. A process for making chemically resistant pipe from a mixture of granitic-type aggregate, furan resin and a catayst, comprising the steps: blending the granitic-type aggregate with a powdered catalyst; mixing the resin at a temperature of approximately 40° F. with the blend of aggregate and catalyst; and centrifugally casting the mixture in a pipe form until a thin layer of resin forms on the interior surface of the casting, said pipe form then being rotated at reduced speed while subjecting the pipe casting to a heat source.

References Cited by the Examiner
UNITED STATES PATENTS

| | | | |
|---|---|---|---|
| 1,644,361 | 10/1927 | Talbot | 138—145 |
| 2,773,287 | 12/1956 | Stout. | |
| 2,783,174 | 2/1957 | Stephens. | |
| 3,012,922 | 12/1961 | Wiltshire. | |

ROBERT F. WHITE, *Primary Examiner.*

S. A. HELLER, *Assistant Examiner.*